United States Patent
Stanchus et al.

[11] Patent Number: 5,842,071
[45] Date of Patent: Nov. 24, 1998

[54] CAMERA BACK

[75] Inventors: Robert J. Stanchus; William B. Salvas, both of Rochester, N.Y.

[73] Assignee: Eastman Kodak Company, Rochester, N.Y.

[21] Appl. No.: 878,836

[22] Filed: Jun. 20, 1997

[51] Int. Cl.⁶ .......................... G03B 17/00; G03B 17/02
[52] U.S. Cl. .................. 396/440; 396/315; 396/442; 396/535; 396/539
[58] Field of Search .......................... 396/6, 310, 315, 396/317, 318, 319, 440, 442, 535, 536, 538, 539

[56] References Cited

U.S. PATENT DOCUMENTS

| | | | |
|---|---|---|---|
| 3,754,453 | 8/1973 | Ernisse et al. | 396/539 |
| 4,232,956 | 11/1980 | Hashimoto et al. | 396/310 |
| 4,361,388 | 11/1982 | Mlcak et al. | 396/318 |
| 5,517,266 | 5/1996 | Funaki et al. | 396/319 |
| 5,526,079 | 6/1996 | Goto et al. | 396/310 |
| 5,649,236 | 7/1997 | Balling | 396/6 |

*Primary Examiner*—Eddie C. Lee
*Attorney, Agent, or Firm*—Roger A. Fields

[57] ABSTRACT

A camera back comprising a film support for ensuring the shape of a filmstrip, is characterized in that the film support has a plurality of parallel film shaping ribs integral with the camera back, an opening for a battery is formed in the camera back to be located across at least some of the film ribs, and a door for closing the opening has integral rib-extensions that are longitudinally aligned with the film ribs across which the opening is located.

3 Claims, 2 Drawing Sheets

CAMERA BACK

CROSS-REFERENCE TO RELATED APPLICATION

Reference is made to commonly assigned copending application Ser. No. 08/878,837, entitled CAMERA BACK and filed Jun. 20, 1997 in the names of Robert J. Stanchus and William B. Salvas.

FIELD OF THE INVENTION

The invention relates generally to the field of photography, and in particular to a camera back.

BACKGROUND OF THE INVENTION

It is generally known for a camera back to include a light emitting device for recording information on a filmstrip in conjunction with picture-taking, and a film support for ensuring the shape of the filmstrip when information is recorded on the filmstrip. As shown in U.S. Pat. No. 4,361,388 issued Nov. 30, 1982 and U.S. Pat. No. 5,517,266 issued May 14, 1996, a flat resiliently suspended film pressure or a flat fixidly suspended film guide plate has recording openings through which information from a light emitting device is recorded on a filmstrip in conjunction with picture-taking. A battery for the light emitting device is separately located.

Economy of space is a consideration in designing the camera back.

THE CROSS-REFERENCED APPLICATION

The cross-referenced application discloses a camera back comprising a light emitting device for recording information on a filmstrip in conjunction with picture-taking, and a film support for ensuring the shape of the filmstrip when information is recorded on the filmstrip. The film support has a plurality of parallel curved film ribs integral with the camera back for shaping the filmstrip in a curve. A recording opening is formed in the camera back adjacent one of the curved film ribs. The light emitting device has a flat light emitting face positioned over the recording opening at an acute angle with respect to the one film rib.

SUMMARY OF THE INVENTION

According to the invention, a camera back comprising a film support for ensuring the shape of a filmstrip, is characterized in that:

an opening for a battery is formed in the film support; and a door for closing the opening is configured to provide a film-supporting extension of the film support when said door is closed.

More specifically, a camera back comprising a film support for ensuring the shape of a filmstrip, is characterized in that:

the film support has a plurality of parallel film shaping ribs integral with the camera back;

an opening for a battery is formed in the camera back to be located across at least some of the film ribs; and a door for closing the opening has integral rib-extensions that are longitudinally aligned with the film ribs across which the opening is located, to provide respective continuations of those film ribs.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
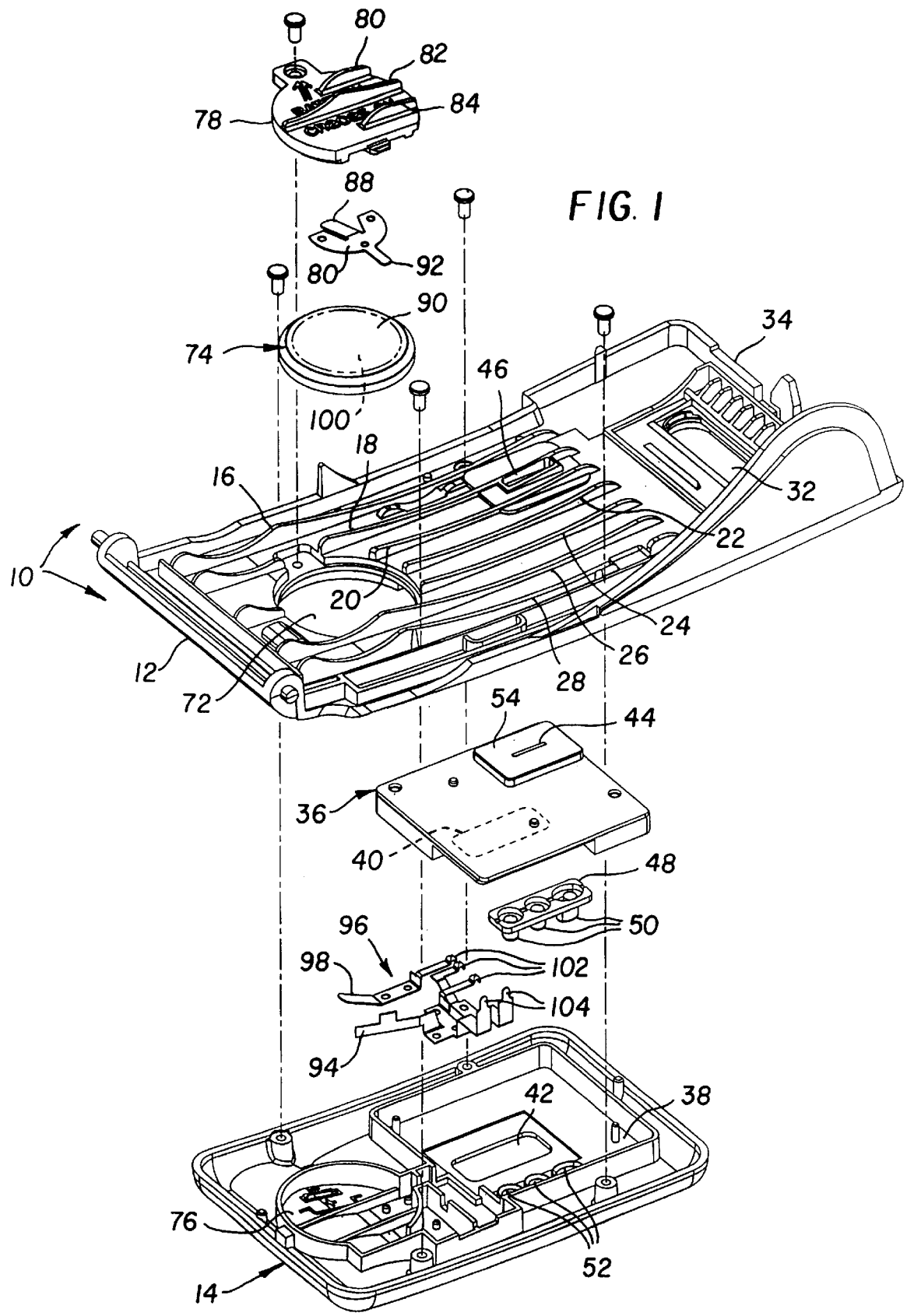
FIG. 1 is an exploded perspective view of a camera back pursuant to a preferred embodiment of the invention.
Figure 2:
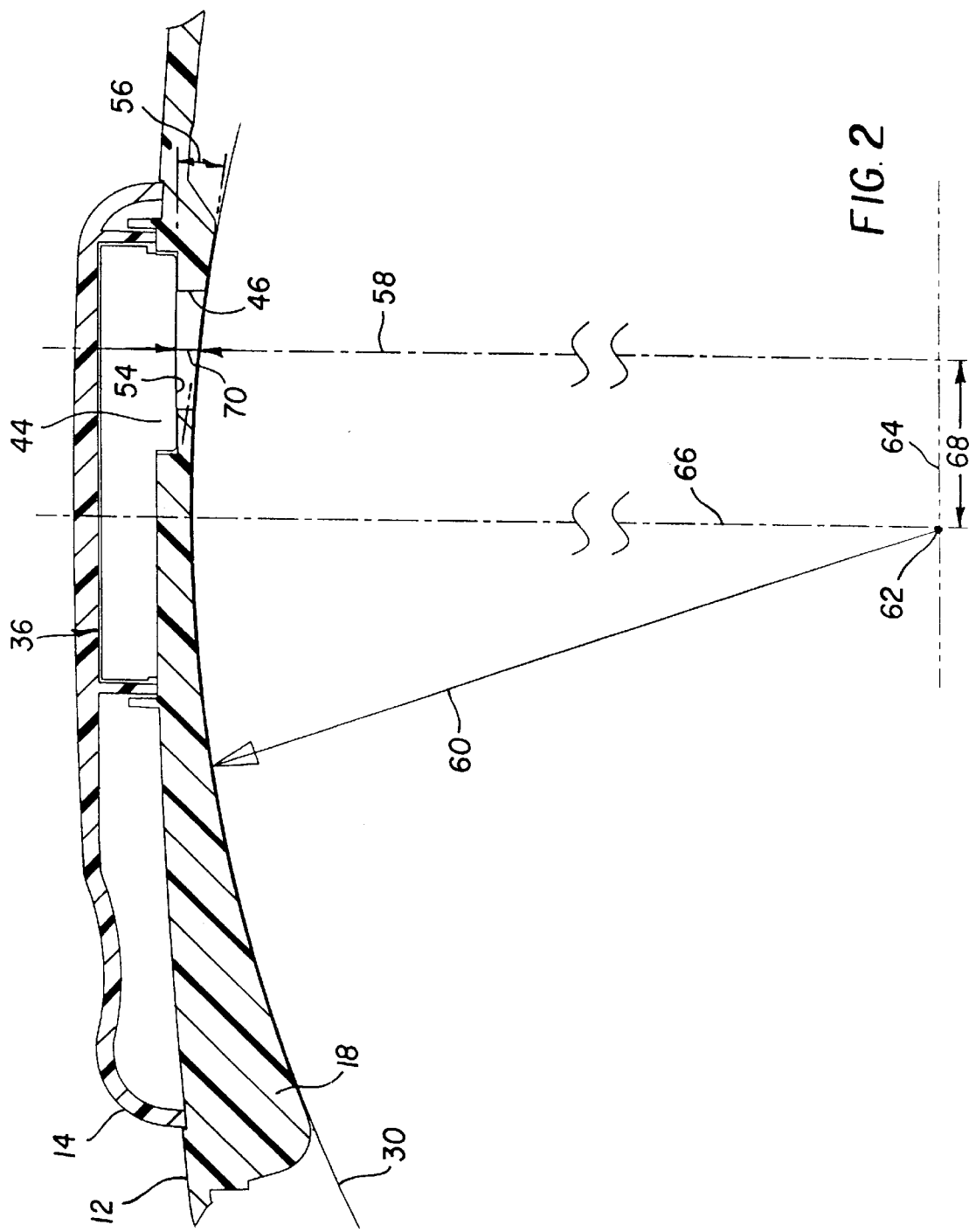
FIG. 2 is a partial sectional view of the camera back.

Referring now to the drawings, FIGS. 1 and 2 show a camera back 10 which is part of a photographic camera, not shown. The camera back 10 includes a camera back cover 12 and a dateback cover 14 screw-connected together. The camera back cover 12 has seven parallel curved film ribs 16, 18, 20, 22, 24, 26 and 28, integral with the camera back cover, for shaping a filmstrip 30 in a slight curve within the photographic camera. The camera back cover 12 is curved substantially similarly to the curvature of the curved film ribs 16, 18, 20, 22, 24, 26 and 28. A film cartridge viewing window 32 is formed in the camera back cover 12 proximate one end 34 of the camera back cover.

A commercially available dateback module 36, known as the Seiko-Epson Model 300C Dateback Module, is secured between the camera back cover 12 and the dateback cover 14, primarily within a rectangular nest 38 in the dateback cover. See FIG. 1. The dateback module 36 has an eye-readable LCD 40, which can be seen through an LCD viewing window 42 in the dateback cover 14, and a backlit LCD 44, which is located at a film recording opening 46 in the camera back cover 12. The eye-readable LCD 40 and the backlit LCD 44 are capable of individually providing an indication of the date of picture-taking or other information for each exposure made in the photographic camera. An elastomeric key pad 48, which is coupled to the dateback module 36, has three date-setting push buttons 50 that project into respective holes 52 in the dateback cover 14. The film recording opening 46 is formed in the camera back cover 12 adjacent one side of the curved film rib 18, and it extends or cuts partially into that side of the film rib.

The backlit LCD 44 has a flat light emitting face 54 that is positioned over the film recording opening 46 at an acute angle 56 with respect to the film rib 18. See FIG. 2. The flat light emitting face 54 extends non-tangentially with respect to the film rib 18, but alternatively it can extend tangentially with respect to the film rib. The backlit LCD 44 is activated when a camera shutter is opened, in order to record the date of picture-taking on the filmstrip 30.

As shown in FIG. 2, the flat light emitting face 54 and the film recording opening 46 have a common centerline 58, and the curved film rib 18 (as well as the other film ribs 16, 20, 22, 24, 26 and 28) has a radius of curvature 60 with a centerpoint of curvature 62 that extends in a plane 64 perpendicular to the common centerline. The centerpoint of curvature 62 is located on the optical axis 66 of a camera taking lens. The optical axis 66 extends parallel to the common centerline 58. Preferably, the radius of curvature 60 is more than ten times greater than the distance 68 within the plane 64 between the centerpoint of curvature 62 and the common centerline 58. Moreover, the distance 68 within the plane 64 between the centerpoint of curvature 62 and the common centerline 58 is more than eight times the distance 70 along the common centerline between the flat light emitting face 54 and the filmstrip 30.

A round opening 72 for receiving a round battery 74 is formed in the camera back cover 12. See FIG. 1. The round opening 72 is located across the three curved film ribs 18, 20 and 22, and is open to a round nest 76 in the dateback cover 14 for holding the battery 74. A door 78 for closing the round opening 72 has three integral parallel curved rib-extensions 80, 82 and 84 that are longitudinally aligned with the film ribs 18, 20 and 22 when the door is closed, to provide respective continuations of those film ribs. An electrically conductive contact 86, secured to the door 78, has one end 88 in touch with a negative side 90 of the battery 74 and another end 92 in touch with one leg 94 of an electrically conductive contact 96, secured to the dateback cover 14. Another leg 98 of the contact 96 is in touch with a positive side 100 of the battery 74, and three prongs 102 of the contact are connected to the dateback module 36. A pair of synchronization pins 104 of the contact 96 are adapted to be shorted when the camera shutter is opened, in order to activate the backlit LCD 44.

The invention has been described with reference to a preferred embodiment. However, it will be appreciated that variations and modifications can be effected by a person of ordinary skill in the art without departing from the scope of the invention.

PARTS LIST 10. camera back
12. camera back cover
14. dateback cover
16. film rib
18. film rib
20. film rib
22. film rib
24. film rib
26. film rib
28. film rib
30. filmstrip
32. film cartridge viewing window
34. end of camera back cover 12
36. dateback module
38. nest
40. eye-readable LCD
42. LCD viewing window
44. backlit LCD
46. film recording opening
48. elastomeric key pad
50. date-setting push buttons
52. holes
54. flat light emitting face
56. acute angle
58. common centerline
60. radius of curvature
62. center of curvature
64. plane
66. optical axis
68. distance
70. distance
72. round opening
74. battery
76. nest
78. door
80. rib-extension
82. rib-extension
84. rib-extension
86. contact
88. one end
90. negative side
92. another end
94. one leg
96. contact
98. another leg
100. positive side
102. three prongs
104. two synchronization pins

What is claimed is:

1. A camera back comprising a film support for ensuring the shape of a filmstrip, is characterized in that:

said film support has a plurality of parallel film shaping ribs integral with said camera back;

an opening for a battery is formed in said camera back to be located across at least some of said film ribs; and a door for closing said opening has integral rib-extensions that are longitudinally aligned with said film ribs across which the opening is located, to provide respective continuations of those film ribs.

2. A camera back as recited in claim 1, wherein said film ribs and said rib-extensions are commonly curved.

3. A camera back as recited in claim 1, wherein said opening extends completely through said camera back.

* * * * *